US010843505B2

(12) United States Patent
Bertoldi et al.

(10) Patent No.: US 10,843,505 B2
(45) Date of Patent: Nov. 24, 2020

(54) ZERO-POROSITY NPR STRUCTURE AND TUNING OF NPR STRUCTURE FOR PARTICULAR LOCALITIES

(71) Applicants: President and Fellows of Harvard College, Cambridge, MA (US); Katia Bertoldi, Somerville, MA (US); Fabian Enrique Sanchez Guerrero, Montreal (CA); Matthew Christopher Innes, North Lancaster (CA); Farhad Javid, Somerville, MA (US); Minh Quan Pham, Saint-Laurent (CA); Megan Schaenzer, Sr., Montreal (CA); Ali Shanian, Montreal (CA); Evelyne Smith-Roberge, Montreal (CA)

(72) Inventors: Katia Bertoldi, Somerville, MA (US); Fabian Enrique Sanchez Guerrero, Montreal (CA); Matthew Christopher Innes, North Lancaster (CA); Farhad Javid, Somerville, MA (US); Minh Quan Pham, Saint-Laurent (CA); Megan Schaenzer, Sr., Montreal (CA); Ali Shanian, Montreal (CA); Evelyne Smith-Roberge, Montreal (CA)

(73) Assignees: President and Fellows of Harvard College, Cambridge, MA (US); Siemens Canada Limited, Oakville (CA)

( * ) Notice: Subject to any disclaimer, the term of this patent is extended or adjusted under 35 U.S.C. 154(b) by 257 days.

(21) Appl. No.: 15/542,422

(22) PCT Filed: Jan. 9, 2016

(86) PCT No.: PCT/US2016/012765
§ 371 (c)(1),
(2) Date: Jul. 8, 2017

(87) PCT Pub. No.: WO2016/112364
PCT Pub. Date: Jul. 14, 2016

(65) Prior Publication Data
US 2018/0009257 A1    Jan. 11, 2018

Related U.S. Application Data

(60) Provisional application No. 62/118,819, filed on Feb. 20, 2015, provisional application No. 62/101,823, filed on Jan. 9, 2015.

(51) Int. Cl.
*B32B 3/26* (2006.01)
*B44F 99/00* (2013.01)
(Continued)

(52) U.S. Cl.
CPC ............... *B44F 99/00* (2013.01); *B32B 3/26* (2013.01); *C22C 19/03* (2013.01); *C22C 19/05* (2013.01);
(Continued)

(58) Field of Classification Search
CPC .... B32B 1/00; B32B 1/04; B32B 3/00; B32B 3/02; B32B 3/26; B32B 3/28; B32B 3/30;
(Continued)

(56) References Cited

U.S. PATENT DOCUMENTS 662,567 A * 11/1900 von Lipowska et al. ..................
B21D 13/02
428/604
2,020,639 A * 11/1935 Grayson et al. ...... E04C 2/3405
428/188
(Continued)

FOREIGN PATENT DOCUMENTS

EP         0971172 A1    1/2000
KR   20050100763 A1 * 10/2005
(Continued)

OTHER PUBLICATIONS

Machine translation (KIPRIS) of KR 2005-0100763 A. Translated Feb. 4, 2019. (Year: 2019).*
(Continued)

*Primary Examiner* — Maria V Ewald
*Assistant Examiner* — Ethan A. Utt
(74) *Attorney, Agent, or Firm* — Nixon Peabody LLP (57) ABSTRACT

The present concepts include a zero-porosity structure having a plurality of structural elements arranged to provide a (Continued)

negative Poisson's ratio and, further, a new mechanism to generate negative Poisson's ratio is single material, zero-porosity structure.

7 Claims, 6 Drawing Sheets

(51) Int. Cl.
*C22C 19/05* (2006.01)
*C22C 19/03* (2006.01)
*C22C 19/07* (2006.01)
*F23R 3/00* (2006.01)

(52) U.S. Cl.
CPC .............. *C22C 19/07* (2013.01); *F23R 3/002* (2013.01); *C21D 2201/00* (2013.01); *C21D 2201/03* (2013.01); *C21D 2211/00* (2013.01); *Y10T 428/24628* (2015.01)

(58) Field of Classification Search
CPC .... B32B 3/10; B32B 3/12; B32B 3/14; B32B 3/16; B32B 3/18; Y10T 428/24628; Y10T 428/24636; Y10T 428/24645; Y10T 428/24653; Y10T 428/24661; Y10T 428/24669; Y10T 428/24678; Y10T 428/24686; Y10T 428/24694; Y10T 428/24702; Y10T 428/24711; Y10T 428/24719; Y10T 428/24727; Y10T 428/24736; Y10T 428/24744; Y10T 428/24149; Y10T 428/24157; Y10T 428/24165; Y10T 428/1241; Y10T 428/12417; E04C 2/00; E04C 2/30; E04C 2/32; E04C 2/322; E04C 2/328; E04C 2/34; E04C 2/3405; E04C 2/36; E04C 2/365; E04C 2002/3411; E04C 2002/3416; E04C 2002/3422; E04C 2002/3427; E04C 2002/3433; E04C 2002/3438; E04C 2002/3444; E04C 2002/3455; E04C 2002/3472
USPC ......... 428/174–187, 116–118, 188, 603, 604
See application file for complete search history.

(56) References Cited

U.S. PATENT DOCUMENTS

| | | | |
|---|---|---|---|
| 2,738,297 A | 3/1956 | Pfistershammer | |
| 3,655,501 A | 4/1972 | Tesch | |
| 4,919,200 A * | 4/1990 | Glomski | F28D 9/0037 165/166 |
| 5,233,828 A | 8/1993 | Napoli | |
| 6,223,641 B1 | 5/2001 | Kang | |
| 6,692,812 B1 | 2/2004 | Watanabe | |
| 6,780,361 B1 | 8/2004 | Sridharan | |
| 6,926,947 B1 * | 8/2005 | Seckel | B32B 1/00 206/585 |
| 7,255,910 B1 * | 8/2007 | Seckel | B32B 1/00 206/585 |
| 8,066,482 B2 | 11/2011 | Strohl | |
| 10,611,118 B2 * | 4/2020 | Bertoldi | B31D 3/002 |
| 2005/0039899 A1 * | 2/2005 | Brost | F28F 1/40 165/167 |
| 2005/0153634 A1 | 7/2005 | Sridharan | |
| 2007/0122590 A1 | 5/2007 | Lalvani | |
| 2009/0041978 A1 | 2/2009 | Sogard | |
| 2010/0009120 A1 | 1/2010 | Boyce | |
| 2011/0059291 A1 | 3/2011 | Boyce | |
| 2011/0081235 A1 | 4/2011 | Shah | |
| 2011/0168313 A1 | 7/2011 | Ma | |
| 2012/0021167 A1 * | 1/2012 | Plant | B32B 3/26 428/116 |
| 2012/0315456 A1 | 12/2012 | Scarpa | |
| 2015/0290050 A1 * | 10/2015 | Wada | B32B 3/266 604/385.01 |

FOREIGN PATENT DOCUMENTS

| | | | |
|---|---|---|---|
| WO | WO-2014084066 A1 * | 6/2014 | ........ A61F 13/51104 |
| WO | WO 2014/149078 A1 | 9/2014 | |
| WO | WO 2014/151045 A1 | 9/2014 | |
| WO | WO 2014/197059 A1 | 12/2014 | |
| WO | WO 2016/112364 A1 | 7/2016 | |

OTHER PUBLICATIONS

Extended European Search Report for Application No. 16735527, dated Jun. 19, 2018 (9 pages).

Li et al.; "Temperature insensitive negative Poisson's ratios in isotropic alloys near a morphotropic phase boundary"; Applied Physics Letters, vol. 101, pp. 251903(1-4); Dec. 19, 2012 retrieved from http://silver.neep.wisc.edu/~lakes/PoissonPhaseAPL12.pdf; (4 pages).

Schenk; "Folded Shell Structures"; Univ. of Cambridge; Aug. 21, 2011, pp. ; retrieved from http://www.markschenk.com/research/files/PhD%20thesis%20-%20Mark%20Schenk.pdf; (155 pages).

International Search Report and Written Opinion of International Searching Authority for PCT/US2016/012765 dated Mar. 14, 2016 (14 pages).

International Search Report and Written Opinion of International Searching Authority for PCT/US2014/024830 dated Jul. 10, 2014 (11 pages).

International Search Report and Written Opinion of International Searching Authority for PCT/US2014/025324 dated Nov. 18, 2014 (6 pages).

* cited by examiner

ZERO-POROSITY NPR STRUCTURE AND TUNING OF NPR STRUCTURE FOR PARTICULAR LOCALITIES

CROSS-REFERENCE TO RELATED APPLICATIONS

This application is a national stage of International Application No. PCT/US2016/012765, filed Jan. 9, 2016, and titled "Zero-Porosity NPR Structure And Tuning Of NPR Structure For Particular Localities," which claims the benefit of U.S. Provisional Patent Application No. 62/118,819, filed on Feb. 20, 2015, and titled "Zero-Porosity NPR Structure And Tuning Of NPR Structure For Particular Localities," and U.S. Provisional Patent Application No. 62/101,823, filed on Jan. 9, 2015, and titled "Zero-Porosity NPR Structure," each of which are incorporated herein by reference in their respective entireties.

TECHNICAL FIELD

The present disclosure relates generally to materials possessing a Negative Poisson's Ratio ("NPR"), as well as systems, methods and devices using such materials.

BACKGROUND

When materials are compressed along a particular axis they are most commonly observed to expand in directions orthogonal to the applied load. The property that characterizes this behavior is the Poisson's Ratio, which can be defined as the ratio between the negative transverse and longitudinal strains. The majority of materials are characterized by a positive Poisson's Ratio, which is approximately 0.5 for rubber and 0.3 for glass and steel.

Materials with a Negative Poisson's Ratio will contract (or expand) in the transverse direction when compressed (or stretched) and, although they can exist in principle, demonstration of practical examples is relatively recent. Materials that exhibit negative Poisson's Ratio behavior are oftentimes referred to as "auxetics". The results of many investigations suggest that the auxetic behavior involves an interplay between the microstructure of the material and its deformation. Examples of this are provided by the discovery that metals with a cubic lattice, natural layered ceramics, ferroelectric polycrystalline ceramics, and zeolites may all exhibit negative Poisson's Ratio behavior. Moreover, several geometries and mechanisms have been proposed to achieve negative values for the Poisson's Ratio, including foams with reentrant structures, hierarchical laminates, polymeric and metallic foams. Negative Poisson's Ratio effects have also been demonstrated at the micrometer scale using complex structures which were fabricated using soft lithography and at the nanoscale with sheets assemblies of carbon nanotubes.

U.S. Pat. No. 5,233,828 ("828 patent"), to Phillip D. Napoli, shows an example of an engineered structural member—a combustor liner—utilized in high temperature applications. Combustor liners are generally used in the combustion section of a gas turbine, but can also be used in the exhaust section or in other sections of or components of the gas turbine, such as the turbine blades. In operation, the combustors burn gas at intensely high temperatures, such as around 3,000° F. or higher. To prevent this intense heat from damaging the combustor before it exits to a turbine, the combustor liner is inserted in the combustor to insulate the surrounding engine. To minimize temperature and pressure differentials across the combustor liners, cooling slots have conventionally been provided, such as is shown in '828 patent. The '828 patent shows a portion of an annular combustor liner having spaced cooling holes disposed in a continuous pattern, angled through the wall of the liner. U.S. Pat. No. 8,066,482 B2, to James Page Strohl et al., shows another example of an engineered structural member having cooling holes shaped to enhance the cooling of a desired region of a gas turbine and to reduce stress levels in and around the cooling holes. European Patent No. EP 0971172 A1, to Dr. Jakob Keller, likewise shows another example of a perforated liner used in a combustion zone of a gas turbine. In yet another example, U.S. Patent Application Pub. No. 2010/0009120 A1, to Mary C. Boyce et al., discloses a number of transformative periodic structures which include elastomeric or elasto-plastic periodic solids that experience transformation in the structural configuration upon application of a critical macroscopic stress or strain. PCT patent application PCT/US2014/025324, to the President and Fellows of Harvard College, discloses, inter alia, void structures with repeating elongated-aperture patterns providing Negative Poisson's Ratio behavior. PCT patent application PCT/US2014/024830, to the President and Fellows of Harvard College, discloses, inter alia, a solid having an engineered void structure that causes the solid (having a positive Poisson's ratio) to exhibit pseudo-auxetic (NPR) behavior upon application of stress to the solid. The engineered void structure provides a porosity amenable to, for example, applications involving gas turbine combustors. All of the foregoing patent documents are incorporated herein by reference in their respective entireties for all purposes.

SUMMARY OF THE INVENTION

The present disclosure is directed to transformation of a sheet structure, or one or more subparts thereof, having a Positive Poisson's Ratio (PPR) to a Negative Poisson's Ratio (an "auxetic" structure) along one or more axes.

In at least some aspects of the present concepts, a zero-porosity structure comprises a zero-porosity material comprising a plurality of structural elements arranged to provide a negative Poisson's ratio. In some aspects, the structure comprises a sheet material such as, but not limited to a sheet-steel, strip steel, sheet-metal. In other aspects, the structure may comprise, but is not limited to, a casting or plate metal. In still other aspects, the structure may comprise other form factors and materials including, but not limited to composite materials, polymers and metal alloys.

In at least some other aspects of the present concepts, a zero-porosity structure comprises a first material portion comprising a first tiling of a first plurality of structural elements, and a second material portion comprising a second tiling of a second plurality of structural elements, wherein the first tiling is different from the second tiling and wherein at least one of the first material portion or the second material portion provides, responsive to the respective tiling configuration, at least one of a predetermined local negative Poisson's ratio or a predetermined global negative Poisson's ratio.

In yet other aspects of the present concepts, a method for constructing a zero-porosity structure comprises acts of establishing design constraints for the zero-porosity structure and determining, within the design constraints, at least one tiling pattern bearing a plurality of structural elements having one or more shapes that provide, in the aggregate a resultant negative Poisson's ratio for the structure. The method also includes the act of constructing the zero-porosity structure consistent with the act of determining.

In yet another aspect of the present concepts, a zero-porosity structure comprises a thin-walled structure having formed therein a plurality of structural elements defined which may comprise spherical caps or may be defined by the function $$z = f(x, y) = \exp\left(\delta\left[1 - \frac{1}{1 - \left|\frac{x}{a}\right|^\alpha - \left|\frac{y}{b}\right|^\beta}\right]\right)$$

restricted to:

$$\left|\frac{x}{a}\right|^\alpha + \left|\frac{y}{b}\right|^\beta < 1$$

wherein a and b control the aspect ratio of the ellipsoid in the f(x,y)=0 plane, δ shows the structural element's maximum depth, and α, β vary the out-of-plane curvature, and wherein the structural elements, as a whole, provide the structure with a negative Poisson's ratio.

The above summary is not intended to represent each embodiment or every aspect of the present disclosure. Rather, the summary merely provides an exemplification of some of the novel features presented herein. The above features and advantages, and other features and advantages of the present disclosure, will be readily apparent from the following detailed description of exemplary embodiments and modes for carrying out the present invention when taken in connection with the accompanying drawings and the appended claims.

While aspects of this disclosure are susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

The drawings and description herein provide representative embodiments of the invention with the understanding that the present disclosure is to be considered as an exemplification of the principles of the invention and is not intended to limit the broad aspects of the invention to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the word "all" means "any and all"; the word "any" means "any and all"; and the words "including" and "comprising" mean "including without limitation." Moreover, words of approximation, such as "about," "almost," "substantially," "approximately," and the like, can be used herein in the sense of "at, near, or nearly at," or "within 3-5% of," or "within acceptable manufacturing tolerances," or any logical combination thereof, for example.

Aspects of the present disclosure are directed towards structures possessing a plurality of structural elements such as, but not limited to concave and/or convex structures or "dimples," formed in a pattern that, in the aggregate, provide a local and/or a global Negative Poisson's Ratio (NPR) or auxetic behavior.

Contrary to the type of NPR structure disclosed in, for example, those described in WO 2014/151045 A1 and US 2011/0059291 A1, incorporated herein by reference in their respective entireties for all purposes, the NPR structures disclosed herein have no porosity.

Figure 1A:
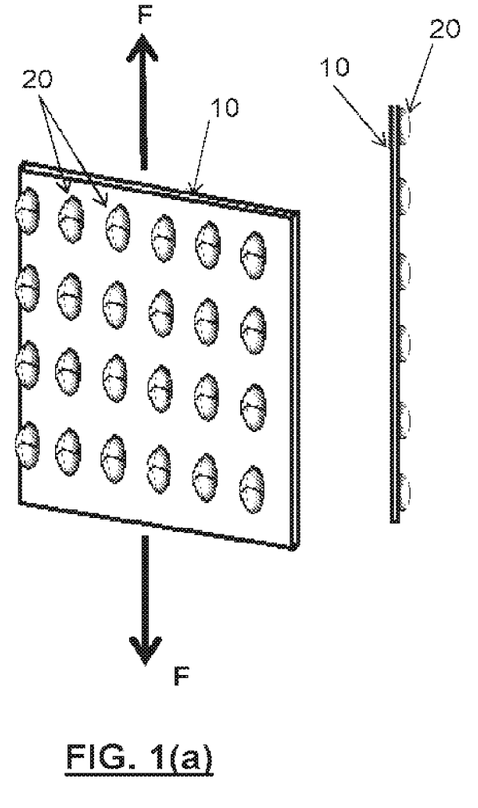
FIG. 1(a) presents isometric and side depictions, respectively, of a sheet patterned with a plurality of structural elements exiting a plane of the sheet in the same direction according to at least some aspects of the present disclosure.
Figure 1B:
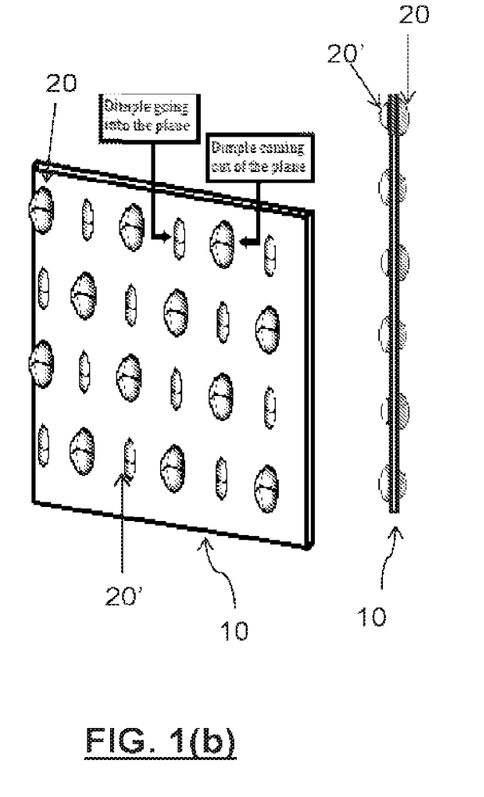
FIG. 1(b) presents isometric and side depictions, respectively, of a sheet patterned with a plurality of structural elements having differing (e.g., alternating as shown) concavities according to at least some aspects of the present disclosure.

FIGS. 1(a)-1(b) present isometric and side depictions, respectively, of (a) a structure 10 (e.g., a sheet material, etc.) patterned with a plurality of structural elements 20 (e.g., "dimples") exiting a plane of the material in the same direction and (b) a structure 10 patterned with a first plurality of structural elements 20 configured to exit a plane of the material in a first direction (e.g., normal to the plane of the sheet, etc.) and a second plurality of structural elements 20' configured to exit a plane of the material in a second direction (e.g., normal to the plane of the sheet in a direction opposite to the first direction, etc.).

In various aspects, the structure comprises a metal, aluminum, steel, and/or an alloy, as appropriate for a particular application. By way of example, in certain high temperature applications, a suitable material may comprise, but is not limited to, a "superalloy" such as a nickel-based superalloy (e.g., Inconel (e.g. IN100, IN600, IN713), Waspaloy, Rene alloys (e.g. Rene 41, Rene 80, Rene 95, Rene N5), Haynes alloys, Incoloy, MP98T, TMS alloys, and CMSX (e.g. CMSX-4) single crystal alloys, etc.).

Figure 1C:
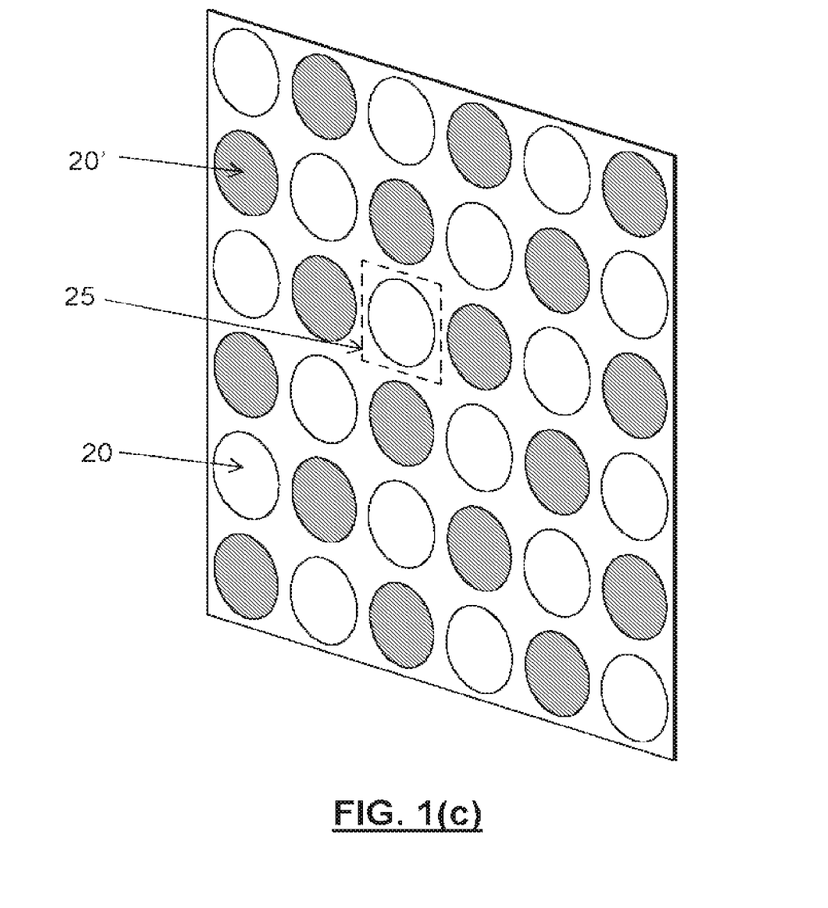
FIG. 1(c) shows a different representation of the sheet according to FIG. 1(b), wherein the sheet is patterned with a series of structural elements with differing (e.g., alternating as shown) concavities.
Figure 1D:
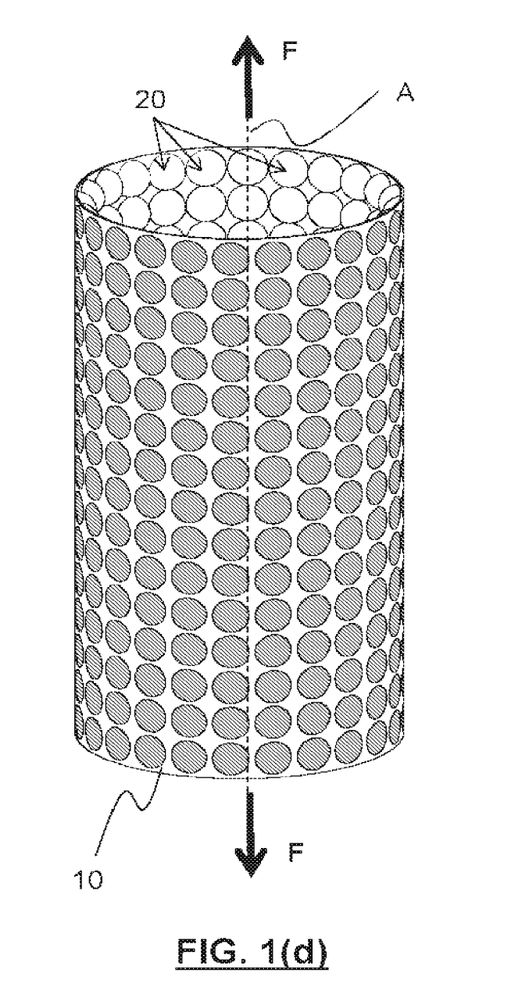
FIG. 1(d) shows a tubular thin-walled structure patterned with a series of inwardly-directed structural elements according to at least some aspects of the present disclosure.
Figure 2A:
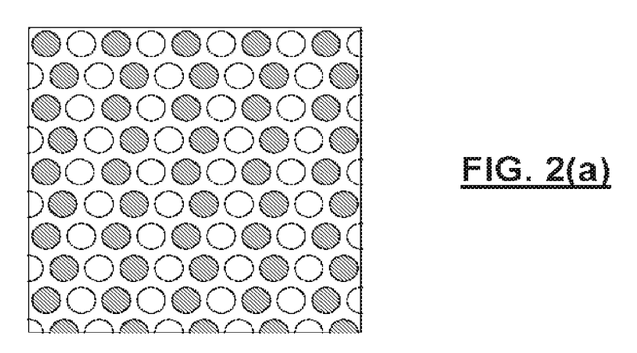
FIGS. 2(a)-2(h) show a variety of non-limiting tiling patterns for sheets bearing a plurality of structural elements, such as those shown in FIGS. 1(a)-1(d), according to at least some aspects of the present disclosure.
Figure 2B:
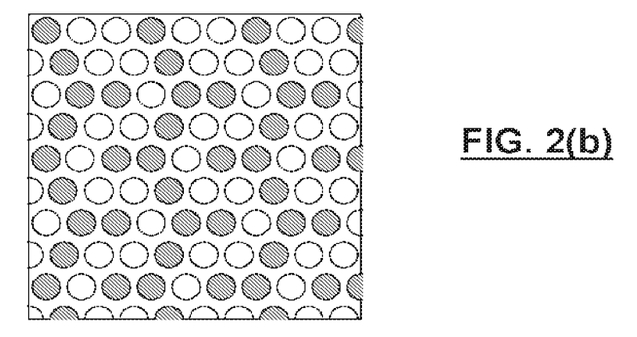
Figure 2C:
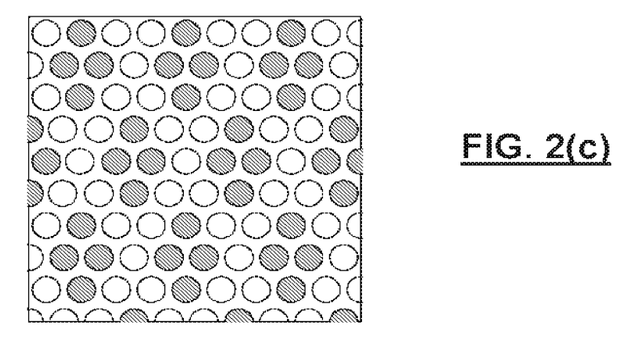
Figure 2D:
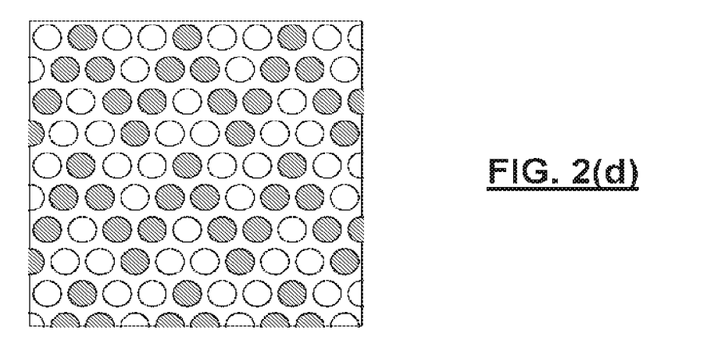
Figure 2E:
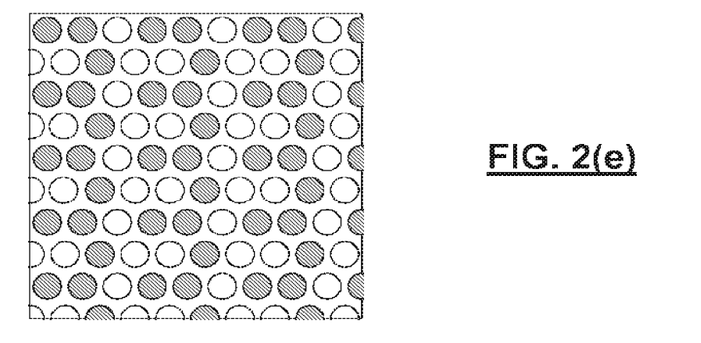
Figure 2F:
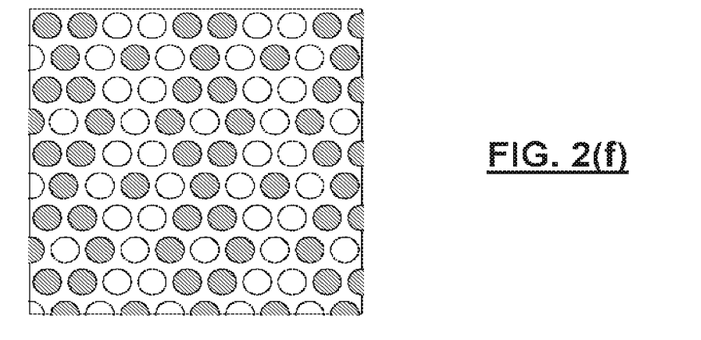
Figure 2G:
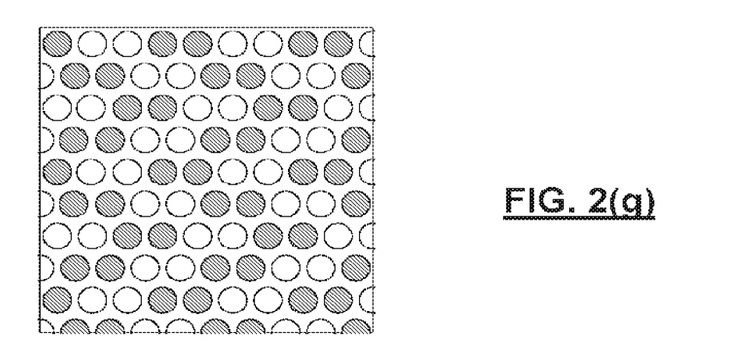
Figure 2H:
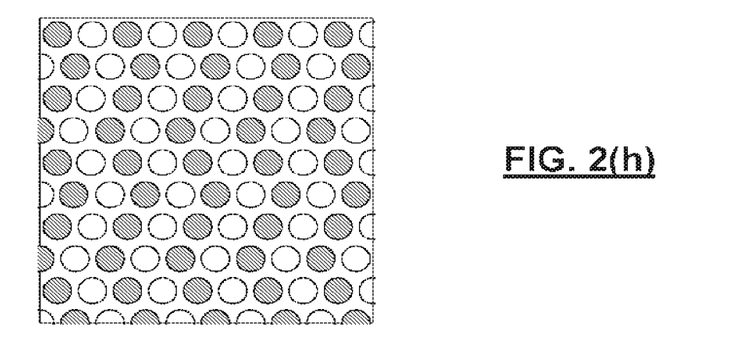

The structural element 20, or combination(s) of different structural elements (e.g., 20, 20'), transform the underlying structure 10 from a Positive Poisson's Ratio (PPR) to a Negative Poisson's Ratio (NPR) responsive to stresses acting along one or more axes such as, but not limited to, tensile force F represented in FIG. 1(a) or FIG. 1(d).

As shown in FIG. 1(b), the first structural elements 20 and the second structural elements 20' are shown in an alternating relationship. However, this exemplary arrangement is non-limiting and the present concepts expressly including any tiling arrangement of one or more structural elements, as disclosed herein, that provide a Negative Poisson's Ratio (NPR). By way of example, further non-limiting tiling patterns for sheets bearing a plurality of structural elements are shown in FIGS. 2(a)-2(h).

FIG. 1(c) shows a different representation of the sheet according to FIG. 1(b), wherein the sheet is patterned with first structural elements 20 (illustrated as white circles) exiting or extending beyond a plane of the structure 10 in a first direction (e.g., normal to the plane of the sheet, etc.) and second structural elements 20' (illustrated as shaded circles) exiting or extending beyond a plane of the material in a second direction (e.g., normal to the plane of the sheet in a direction opposite to the first direction, etc.).

The convention of white circles and shaded circles will further be used in FIGS. 1(d) and 2(a)-2(h) to visually represent structural elements 20, 20' respectively exiting a plane of the structure 10 in different directions (e.g., opposite directions). By way of example, the white circles represent, from a particular reference frame, a convex structure, whereas the shaded circles represent, from that same vantage of the reference frame, a concave structure.

FIG. 1(d) shows an example of a structure 10 formed into a cylindrical shape and patterned with a plurality of structural elements 20 (e.g., dimples) exiting a plane of the sheet in the same direction (inwardly toward a central axis "A" of the cylinder in the example shown). By virtue of the structural elements, in the configuration depicted, the structure 10 is formed to possess a Negative Poisson's Ratio (NPR) rather than a Positive Poisson's Ratio (PPR).

In at least some aspects, the structural elements 20, 20' in FIGS. 1(a)-1(d) comprise spherical caps. As defined herein, "spherical cap" refers to one of the sections resulting from cutting a sphere along a given plane. In the examples shown in FIGS. 1(a)-1(d), the spherical cap structural elements 20, 20' are shown with arbitrarily chosen cross-sections, depth, and out-of-plane profiles for purposes of illustration and these parameters may be varied in accord with various aspects of the present concepts. Specifically, while the illustrated examples show uniformity in the structural elements 20 and 20' (i.e., the examples all show spherical cap structural elements), the present concepts expressly include utilization of different structural elements (e.g., spherical, spheroidal or ellipsoidal caps) on or side or on both sides of the structure 10. The structural elements could comprise, for example, entirely elliptical structural elements a combination of different structural elements, such as a combination of spherical cap structural elements and elliptical structural elements. For any of these structural elements, the structural element can vary in depth, aspect ratio, and steepness of incline, among other design variables.

The structural elements 20, 20', however, could be arranged in different shapes including triangular, square, rhomboidal, and hexagonal lattices. In all cases the structural elements 20, 20' can extend from one side or both sides of the material, which may comprise a flat sheet or a curved or curvilinear material. Some non-limiting arrangements of structural elements 20, 20' are illustrated in FIGS. 2(a)-2(h). It is to be noted, however, that not all these tiling patterns necessarily lead to a global NPR behavior. Instead, some tiling patterns are advantageously utilized to generate special patterns of shrinkage or expansion in the displacement field of the structure. As in the aforementioned cases, such structural elements (e.g., dimples, etc.) are not restricted to spherical caps, but can vary greatly in depth, aspect ratio, and steepness of incline, among other features.

As noted above with respect to FIG. 1(a), one aspect of the present concepts comprises a square lattice of identical structural elements 20 exiting a plane of the structure 10 in the same direction. The structure of FIG. 1(a) exhibits auxetic behavior in cylindrical structures, such as is shown in FIG. 1(d), when subjected to loading, such as is represented by axial forces F. The structure of FIGS. 1(b) and 1(c), on the other hand, shows NPR behavior in planar structures under uniaxial loading.

Although the cross-section, depth and/or out-of-plane profiles can vary significantly in accord with the present concepts, not all possible combinations lead to NPR behavior. The NPR behavior was observed in thin shell structures where the thickness of the material was around 10 times smaller than the other dimensions. In the simulations performed by the inventors, it was observed that the NPR behavior fades away if the radius of the structural element (e.g., spherical cap) cross-section is less than 10 times that of the plate thickness. It was further determined that the cross-sectional area of the structural elements needed to cover a large area of the material surface (e.g., in general, more than about 50%). A pseudo-porosity for structural elements can be defined as the ratio between the combined structural element's cross-sectional area ($A_{SE}$) and the area ($A_S$) of the entire structure (i.e., Pseudo-porosity=$A_{SE}/A_S$). In a local area (e.g., a unit cell), the pseudo-porosity can be understood as the ratio between the area of one of the structural elements (e.g., a white circle shown in FIG. 1 (c)) and that of an imaginary geometric element (e.g., square) surrounding it, such as is shown by the dashed-line square 25 in FIG. 1(c). For a spherical structural element, the pseudo-porosity of the structure is desirably around 50% or higher to ensure NPR behavior. Finally, as noted, the depth of the structural element(s) can also affect the NPR behavior. For example, in spherical structural elements, the optimal value for depth of the structural element is around half that of the radius of the structural element.

As noted above, the structural elements can assume a variety of shapes (including a plurality of shapes for a given material or sub-portion of a material) and can be optimized to impart desired mechanical properties to the material or sub-portion thereof. In addition to the aforementioned geometric shapes such as spherical and spheroidal caps, many different functions can be used to create the structural element profile. For example, a structural element can be generated using the following function:

$$z = f(x, y) = \exp\left(\delta\left[1 - \frac{1}{1 - \left|\frac{x}{a}\right|^\alpha - \left|\frac{y}{b}\right|^\beta}\right]\right)$$

Restricted to:

$$\left|\frac{x}{a}\right|^\alpha + \left|\frac{y}{b}\right|^\beta < 1$$

This structural element can then be tiled on a plane in order to achieve the desired structural element configuration. Alternatively, this structural element can be tiled and alternately inverted on a plane in order to achieve a desired structural element configuration. In the function presented above, a and b control the aspect ratio of the ellipsoid in the f(x,y)=0 plane, δ shows the structural element's (e.g., dimple's) maximum depth, and α, β vary the out-of-plane curvature. The NPR structures can take the form of any material characterized by structural elements sharing a similar shape to those which can be created using the above function.

The main advantage of the proposed structures lies in their non-porousness and the low stress values exhibited under displacement-controlled loading. Since the disclosed zero-porosity NPR materials are non-porous and permit no fluids to pass, they present an excellent candidate for utilization in any structure for which porosity would be disadvantageous such as, but not limited to, turbine components, heat exchangers, piping, supports, fuselages, automotive or vehicular components, or any other structure or component subjected to mechanical and/or thermal loading.

Moreover, tiling patterns may be varied along a particular material or structure to provide tailored localized auxetic behavior and accommodate optimization for more complex applications where different behaviors are required in different sections of a structure. For example, a particular structural element (e.g., a gas turbine combustor component, combustor liner, etc.) may comprise a first material portion having a first tiling pattern comprising one or more distinct structural element types (e.g., arrangement, shape(s), density/densities, depth(s), etc.), a second material portion having a second tiling pattern comprising one or more distinct structural element types, a third material portion having a third tiling pattern comprising one or more distinct structural element types, to an $n^{th}$ material portion having an $n^{th}$ tiling pattern comprising one or more distinct structural element types.

The disclosed structures show very low stress values under displacement-controlled cases and demonstrate relatively high structural stiffness, which make them very good candidates for use in both load- and displacement-controlled loading conditions.

Regarding the process for selection of specific structural elements, tilings, and shapes, such process is largely informed by external design constraints. The following general concepts are not intended to be restrictive in nature, but are disclosed to illustrate some considerations of the design process. Some initial considerations are generally the dimension limitation on the out-of-plane size (e.g., depth or height) of the structural elements and the thickness of the material (e.g., metal sheet, etc.) The shape type of the structural element (e.g., whether spherical, ellipsoidal, or another shape) is determined by (1) the required negativity of the Poisson's ratio and (2) the maximum allowable stress for the application. If very low negative PRs are required, ellipsoidal structural elements are preferred over spherical ones. Further, the local shape of the structure (e.g., cylindrical, planar, curved, etc.) will influence the direction(s) in which the structural elements exit the plane of the material in that location and/or the tiling pattern. If the maximum stress is a major contributor to the structure's design, spherical dimples are preferred. In view of the above considerations, the size(s) of the microstructure of the structural elements are determined, as is the spacing thereof to arrive at the necessary local and global Poisson's ratio(s). Of course, the order of operations may be freely changed in accord with the present concepts in view of the available design information and imposed constraints. Purely for illustrative purposes, the present concepts even include trial and error optimization techniques in which a variety of tiling patterns, structural element shapes and structural element orientations are iteratively applied for a particular structure to determine an optimal combination of structural element features and placements to attain a desired local and/or global NPR characteristic.

Although the present concepts are disclosed in relation to a variety of patterns or tilings, the present concepts are not limited to utilization of a pattern or tiling. By way of example, the present concepts may even advantageously adopt a local or global randomized distribution, subject to local or global constraints (allowable stress, loading, unloading, peak stress, etc.) to achieve a desired global local or global NPR. Thus, in a given area of a material, locations of structural elements could be disposed in a manner that produces an asymmetrical pattern and yields a desired global local NPR.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed:

1. A zero-porosity structure comprising:
a zero-porosity material comprising a plurality of structural elements arranged to transform an underlying structure from a positive Poisson's Ratio to provide a negative Poisson's ratio, the plurality of structural elements including an array of convex ellipsoid protrusions and concave ellipsoid depressions, each structural element of the plurality of structural elements having a cross-sectional radius and a cross-sectional area;
wherein the zero-porosity material is in the form of a thin shell having a thickness that is about ten times less than lateral dimensions;
wherein the cross-sectional radius is about ten times less than the thickness of the thin shell; and
wherein a total cross-sectional area of all of the plurality of structural elements covers more than about 50% of a material surface of the thin shell.

2. The zero-porosity structure according to claim 1, wherein the convex ellipsoid protrusions exit a plane of the zero-porosity material a normal direction to a side of the zero-porosity material.

3. The zero-porosity structure according to claim 1, wherein the convex ellipsoid protrusions are arranged in at least one tiling pattern on the zero-porosity material.

4. The zero-porosity structure according to claim 3, wherein the concave ellipsoid depressions are arranged in at least one other tiling pattern on the zero-porosity material.

5. The zero-porosity structure according to claim 1, wherein at least one of the plurality of structural elements has a shape defined by the function $$z = f(x,y) = \exp\left(\delta\left[1 - \frac{1}{1 - \left|\frac{x}{a}\right|^\alpha - \left|\frac{y}{b}\right|^\beta}\right]\right)$$

wherein $$\left|\frac{x}{a}\right|^\alpha + \left|\frac{y}{b}\right|^\beta < 1$$

wherein a and b control the aspect ratio of an ellipsoid in the f(x,y)=0 plane,
wherein δ shows the structural element's maximum depth, and
wherein α, β vary the out-of-plane curvature.

6. The zero-porosity structure according to claim 5, wherein a configuration of all of the plurality of structural elements is governed by the function.

7. The zero-porosity structure according to claim 1, wherein the cross-sectional radius of each the structural element is about half of a depth of the structural element.

* * * * *

UNITED STATES PATENT AND TRADEMARK OFFICE
CERTIFICATE OF CORRECTION

PATENT NO.         : 10,843,505 B2
APPLICATION NO.    : 15/542422
DATED              : November 24, 2020
INVENTOR(S)        : Bertoldi et al.

Page 1 of 1

It is certified that error appears in the above-identified patent and that said Letters Patent is hereby corrected as shown below:

In the Claims

Column 8, Line 40 Claim 2, delete "zero-porosity material a normal direction" and insert --zero-porosity material in a normal direction-- therefor.

Column 9, Line 5 Claim 7, delete "of each the structural" and insert --of each structural-- therefor.

Signed and Sealed this
Fifth Day of January, 2021

Andrei Iancu
*Director of the United States Patent and Trademark Office*